(12) United States Patent
Lee et al.

(10) Patent No.: US 8,570,661 B2
(45) Date of Patent: Oct. 29, 2013

(54) PROJECTION LENS SYSTEM

(75) Inventors: An-Tze Lee, New Taipei (TW); Hai-Jo Huang, New Taipei (TW); Fang-Ying Peng, New Taipei (TW); Xiao-Na Liu, Guangdong (CN); Sheng-An Wang, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 3 days.

(21) Appl. No.: 13/340,688

(22) Filed: Dec. 30, 2011

(65) Prior Publication Data

US 2013/0148210 A1 Jun. 13, 2013

(30) Foreign Application Priority Data

Dec. 9, 2011 (CN) .......................... 2011 1 0408380

(51) Int. Cl.
G02B 15/14 (2006.01)

(52) U.S. Cl.
USPC .......................................... 359/682; 359/691

(58) Field of Classification Search
USPC ................................. 359/691, 753, 649, 682
See application file for complete search history.

(56) References Cited

U.S. PATENT DOCUMENTS 7,952,817 B2    5/2011  Kang et al.
2008/0094727 A1 * 4/2008  Kang et al. .................... 359/691

* cited by examiner

*Primary Examiner* — Alciai M Harrington
(74) *Attorney, Agent, or Firm* — Altis & Wispro Law Group, Inc.

(57) ABSTRACT

A projection lens system includes, in order from a screen-side to an SLM-side thereof, a first lens group of negative refractive power which includes a first lens, and a second lens group of positive refractive power. The second lens group includes a second to fifth lenses in order from the screen-side to the SLM-side of the projection lens system. The projection lens system satisfies the following condition formulas: $1.95<|F1/Fw|<2.15$, $0.5<|f4/Fw|<0.7$, and $1.05<|f5/Fw|<1.25$, where F1 is the effective focal length of the first lens group, f4 is the focal length of the fourth lens, and f5 is the focal length of the fifth lens, Fw is the effective focal length of the projection lens system which is in the wide-angle state.

7 Claims, 10 Drawing Sheets

PROJECTION LENS SYSTEM

BACKGROUND

1. Technical Field

The present disclosure relates to lens systems and, particularly, to a projection lens system with a low cost and high resolution.

2. Description of Related Art

To reduce cost, it is better to employ less lenses in projection lens systems. However, image quality will suffer as there is insufficient lenses for effectively correcting the aberrations.

Therefore, it is desirable to provide a projection lens system which can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will be described in detail with reference to the drawings.

Figure 1:
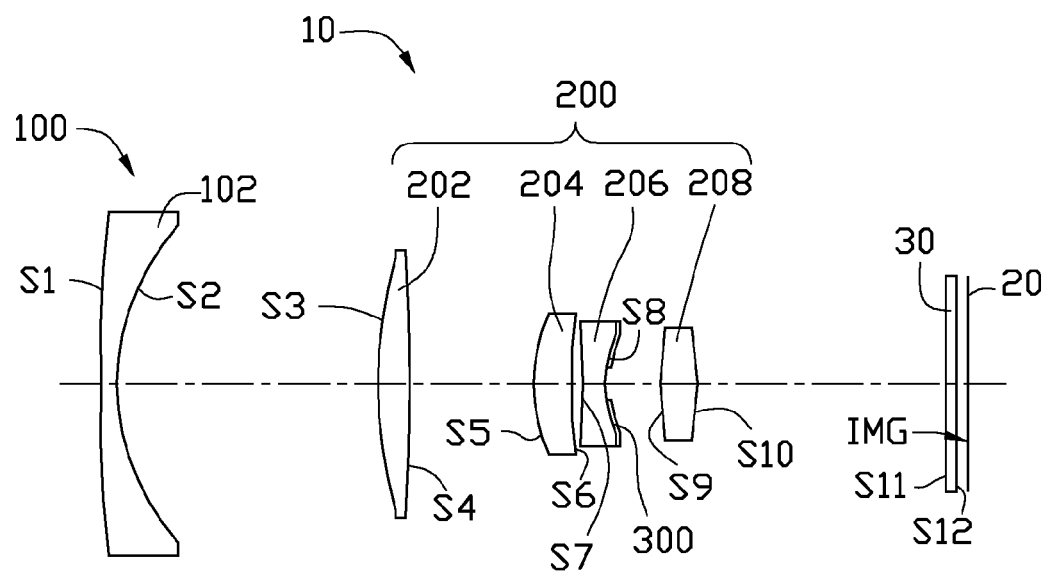
FIG. 1 is a schematic view of a projection lens system which is in a wide-angle state, according to an embodiment.
Figure 2:
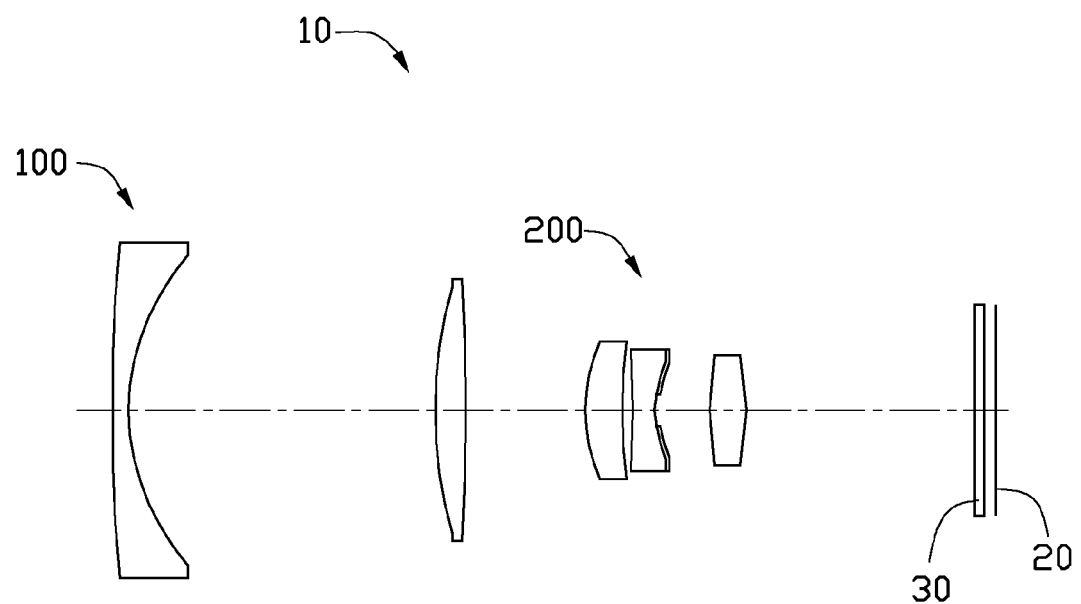
FIG. 2 is similar to FIG. 1, but showing the projection lens in a telephoto state.
Figure 3:
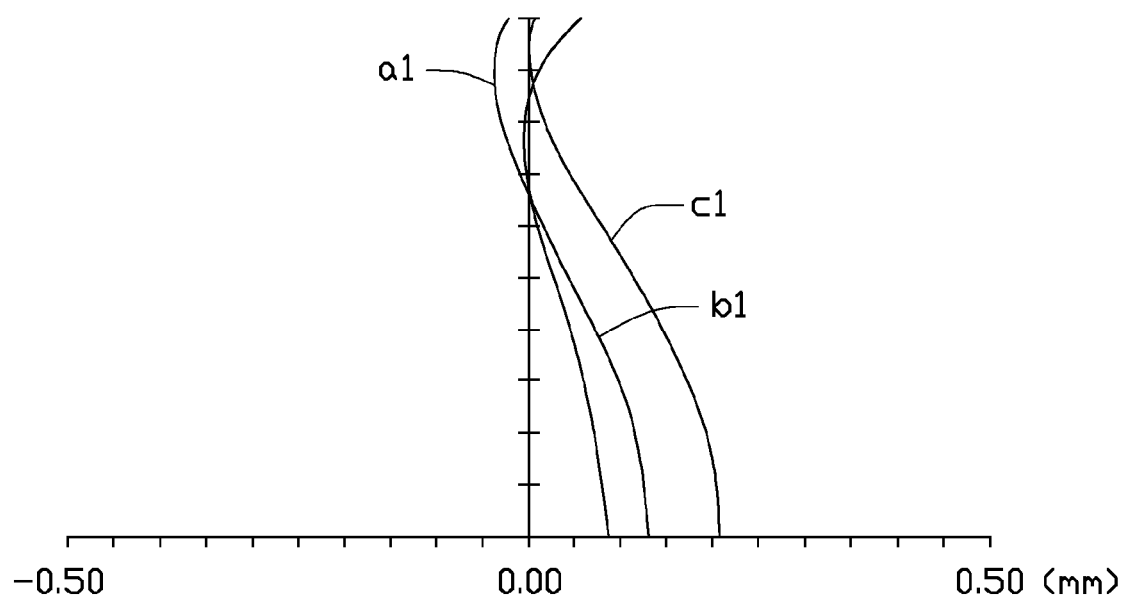
FIGS. 3-6 are graphs showing the longitudinal aberration, field curvature, distortion, and lateral color aberration occurring in the projection lens system of FIG. 1.
Figure 4:
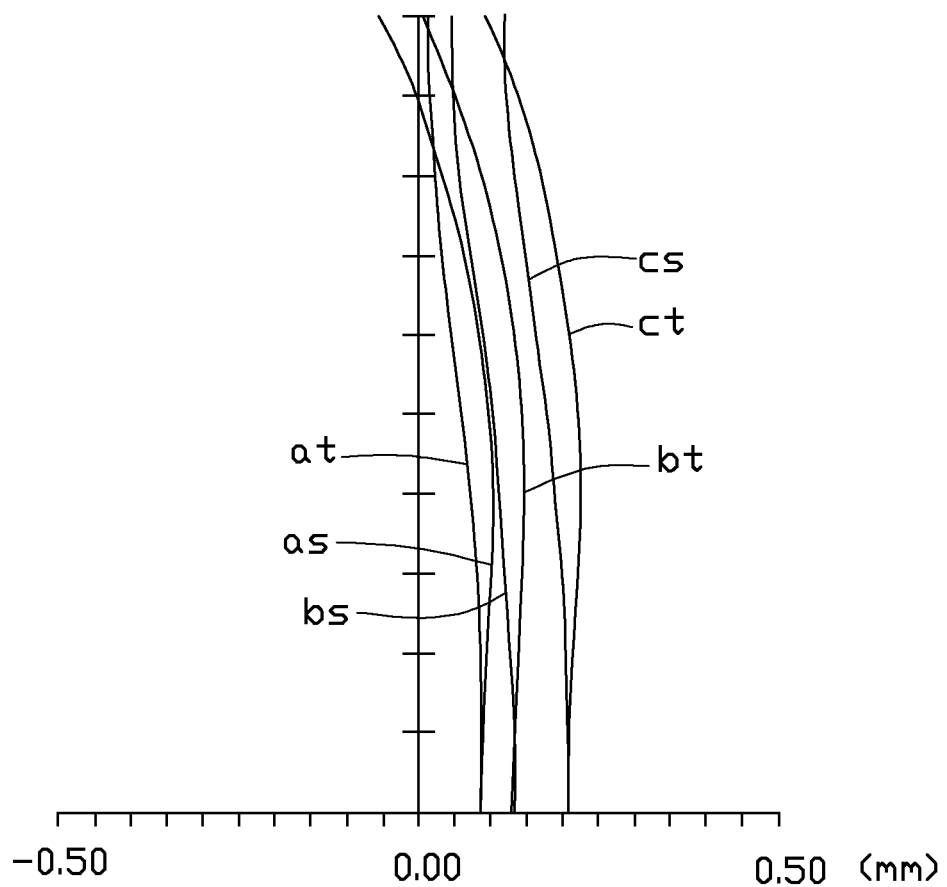
Figure 5:
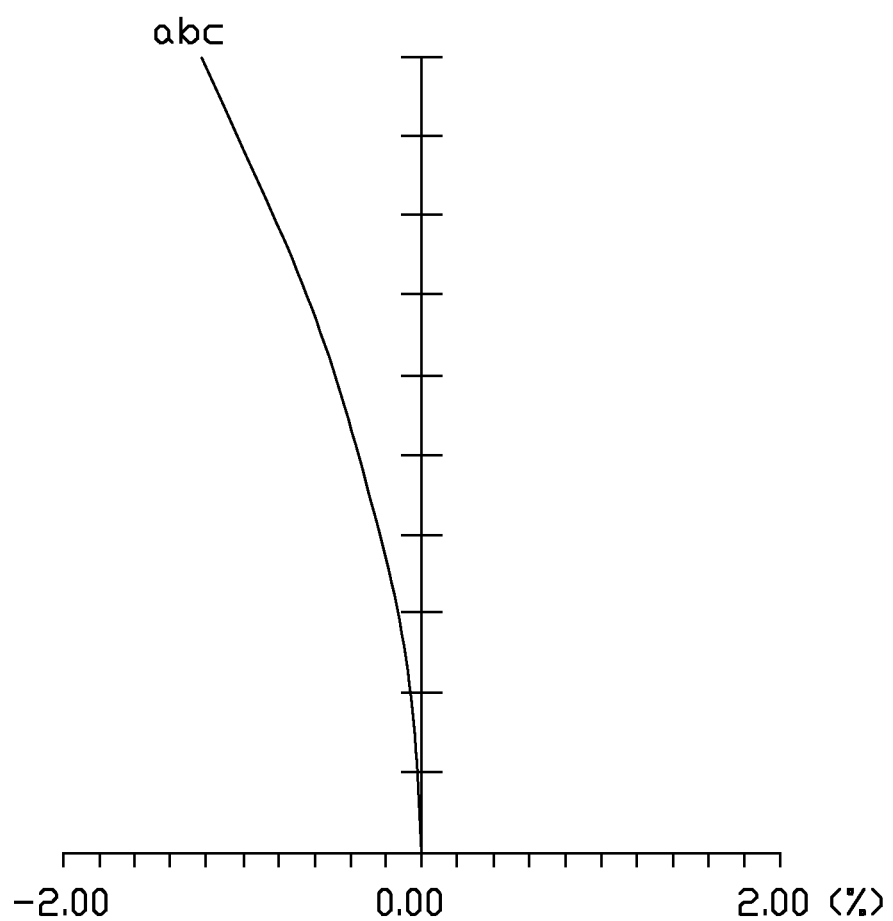
Figure 6:
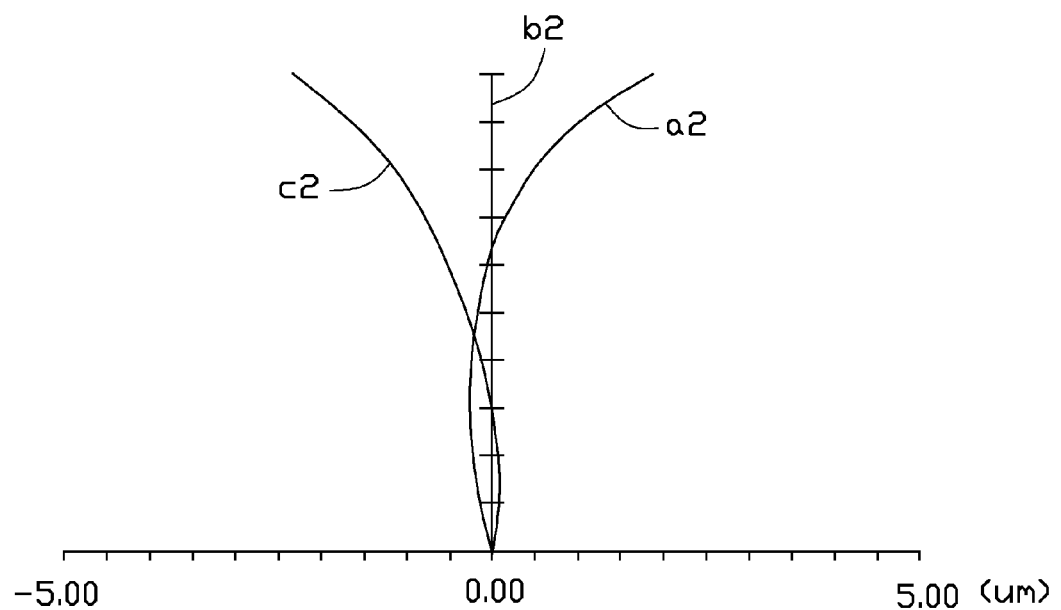
Figure 7:
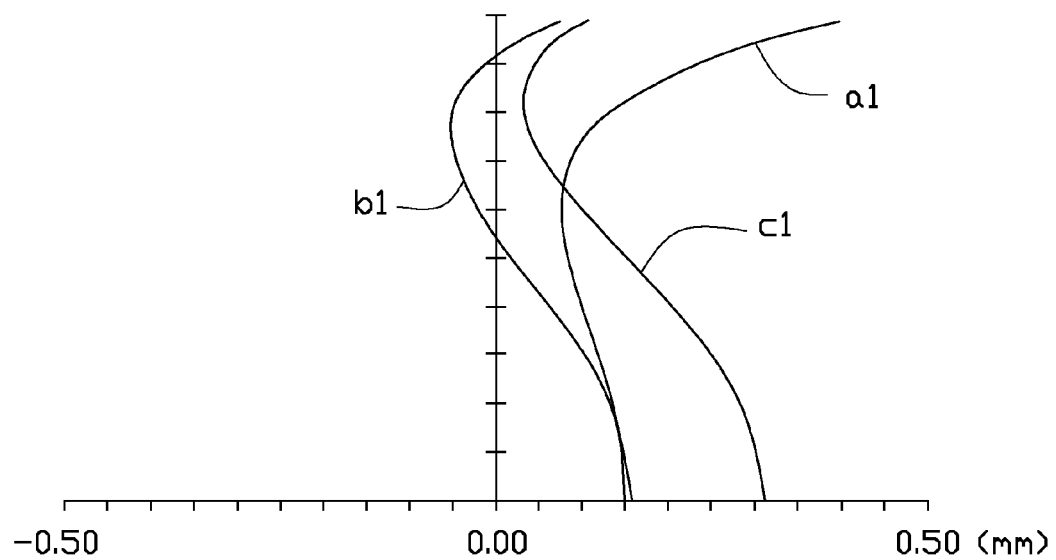
FIGS. 7-10 are graphs showing the longitudinal aberration, field curvature, distortion, and lateral color aberration occurring in the projection lens system of FIG. 2.
Figure 8:
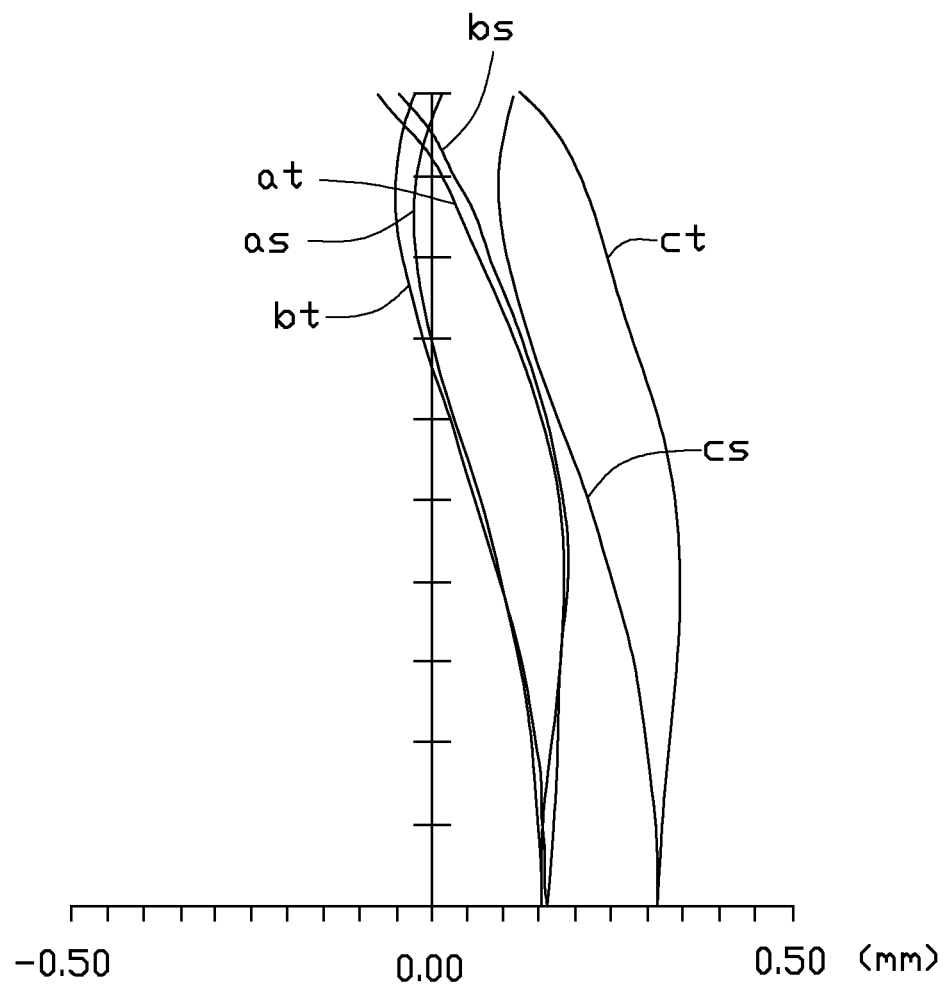
Figure 9:
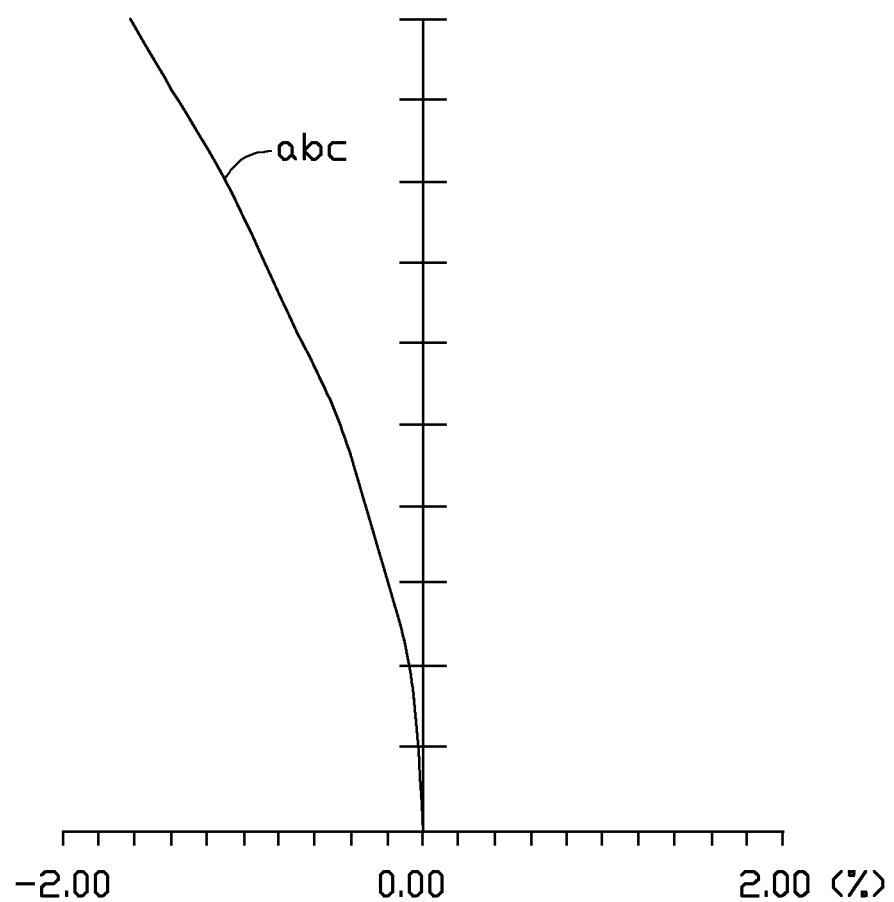
Figure 10:
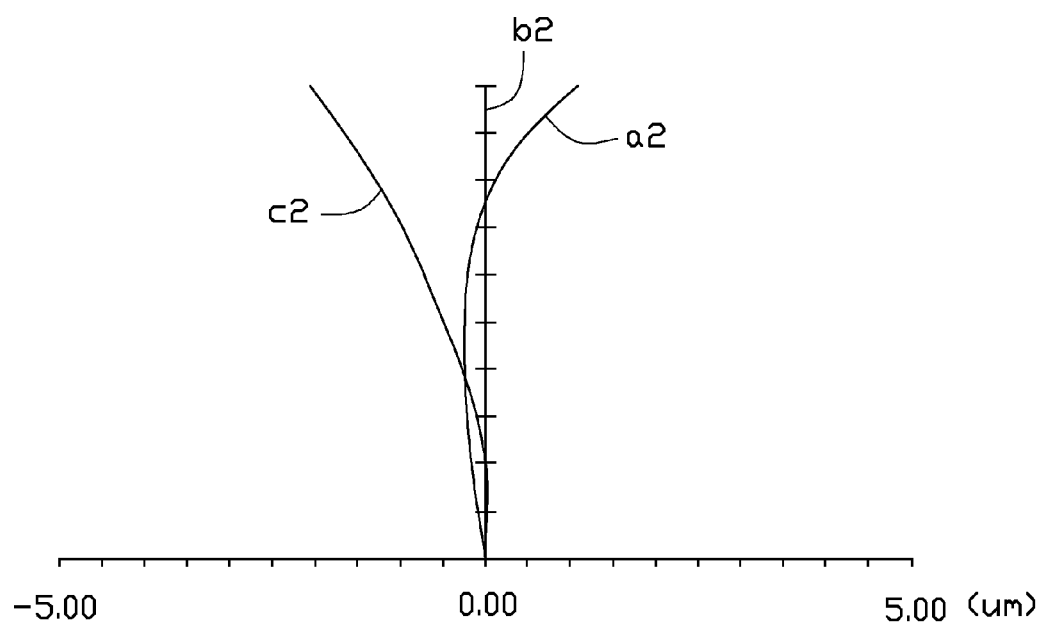

FIGS. 1-2, is a projection lens system 10, according to an embodiment, for projecting optical images generated by a spatial light modulator (SLM) 20 to a screen (not shown). In operation, light rays of the optical images transmit through a cover glass 30 and the projection lens system 10 to the screen.

The projection lens system 10 includes, in this order from a side away from the SLM 20 (hereinafter screen-side) to the other side adjacent to the SLM 20 (hereinafter SLM-side), a first lens group 100 of negative refractive power, a second lens group 200 of positive refractive power. In operation, if an effective focal length of the projection lens system 10 is not appropriate, the projection lens system 10 zooms between a wide-angle state (see FIG. 1) and a telephoto state (see FIG. 2) by driving the first lens group 100 and the second lens group 200 to move along an optical axis of the projection lens system 10. The first lens group 100 includes a first lens 102 of negative refractive power. The second lens group 200 includes, in this order from the screen-side to the SLM-side of the projection lens system 10, a second lens 202 of positive refractive power, a third lens 204 of positive refractive power, a fourth lens 206 of negative refractive power, and a fifth lens 204 of positive refractive power.

The projection lens system 10 satisfies the following condition formulas: $1.95 < |F1/Fw| < 2.15$, $0.5 < |f4/Fw| < 0.7$, and $1.05 < |f5/Fw| < 1.25$, where F1 is the effective focal length of the first lens group 100, f4 is the focal length of the fourth lens 206, and f5 is the focal length of the fifth lens 208, Fw is the effective focal length of the projection lens system 10 which is in the wide-angle state.

As only five lenses are employed, cost of the projection lens system 10 can be controlled. In addition, by satisfying the above-listed condition formulas, astigmatism and spherical aberration can be effectively controlled. As such, the projection lens system 10 has a reduced cost and high resolution.

The first lens 102 is a plastic aspheric lens. The second lens 202, the third lens 204, the fourth lens 206, and the fifth lens 208 are glass spherical lenses. As such, the cost reduction and resolution improvement of the projection lens system 10 can be further balanced, as both the plastic aspheric lenses and the glass spherical lenses balance the cost reduction and resolution improvement well.

The glass lenses can be made of glass material of a refractive index less than 1.85. As such, the cost of the projection lens system 10 can be further reduced, as such glass material is more inexpensive.

The projection lens system 10 further satisfies the following condition formula: $0.45 < |Vd4/Vd5| < 0.55$, wherein here Vd4 and Vd5 are the Abbe numbers of light at the wavelength of 587.6 nm (d light) in the fourth lens 206 and the fifth lens 208, respectively. In this way, any color aberration occurring in the projection lens system 10 can be further restricted.

The projection lens system 10 also satisfies the following condition formula: $Lw*\Phi w < 3.8$, wherein Lw is the total length of the projection lens system 10 which is in the wide-angle state (the distance between a surface of the first lens 102 facing the screen-side and the SLM 20), $\Phi w$ is the total refractive power of the projection lens system 10 which is in the wide-angle state. As such, a reduction of the total length of the projection lens system 10 and effective correction of spherical aberration of the projection lens system 10 can be balanced.

The projection lens system 10 further includes an aperture stop 300 positioned between the fourth lens 206 and the fifth lens 208. The aperture stop 300 moves along with the second lens group 200 when zooming while the aperture remains unchanged.

The aperture stop 300 can be formed on a surface of the fourth lens 206 that faces the fifth lens 208. As such, the total length of the projection lens system 10 can be reduced.

The projection lens system 10 includes, in this order from the screen-side to the SLM-side, surfaces S1-S10. The cover glass 30 includes a surface S11 facing the projection lens system 10 and a surface S11 facing away from the projection lens system 10.

The projection lens system 10 satisfies Table 1, where the following symbols are used:

R: the curvature radius of each surface;
D: the distance between each two adjacent surfaces along the optical axis of the projection lens system 10;
Nd: the refractive index of d light in each lens or the cover glass 20; and
Vd: the Abbe number of d light in each lens or the cover glass 20.

TABLE 1

| Surface | R(mm) | D(mm) | Nd | VD |
|---|---|---|---|---|
| S1 | 143.102 | 1.388 | 1.531 | 56.043 |
| S2 | 20.300 | D2(see Table3) | — | — |
| S3 | 45.845 | 2.747 | 1.851 | 40.104 |
| S4 | −159.860 | 11.462 | — | — |
| S5 | 14.944 | 3.478 | 1.772 | 49.624 |

TABLE 1-continued

| Surface | R(mm) | D(mm) | Nd | VD |
|---|---|---|---|---|
| S6 | 82.563 | 0.982 | — | — |
| S7 | −100.130 | 2.087 | 1.752 | 25.047 |
| S8 | 12.413 | 5.399 | — | — |
| S9 | 100.480 | 3.095 | 1.729 | 54.041 |
| S10 | −22.951 | D10(see Table 3) | — | — |
| S11 | infinity | 1.05 | 1.487 | 70.441 |
| S12 | infinity | 1.11 | — | — |
| IMG | infinity | — | — | — |

The aspherical surface is shaped according to the formula:

$$x = \frac{ch^2}{1 + \sqrt{1-(k+1)c^2h^2}} + \sum A_i h^i,$$

where h is the height from the optical axis of the projection lens system 10 to a point on the aspherical surface, c is the vertex curvature, k is a conic constant, and Ai is the i-th order correction coefficient of the aspherical surface. The projection lens system 10 satisfies Table 2.

TABLE 2

|  | S1 | S2 |
|---|---|---|
| A4 | −6.552e-6 | −1.057e-5 |
| A6 | 7.836e-9 | −2.543e-8 |
| A8 | 7.024e-12 | 2.008e-11 |

The projection lens system 10 satisfies Table 3, where the following symbols are used:
f: the effective focal length of the projection lens system 10;
L: the total length of the projection lens system 10; and
F#: the F number.

TABLE 3

|  | f(mm) | D2(mm) | D10(mm) | L(mm) | F # |
|---|---|---|---|---|---|
| Wide-angle | 21.968 | 29.090 | 21.471 | 83.363 | 2.51 |
| Telephoto | 24.065 | 23.947 | 22.909 | 79.658 | 2.69 |

The values of relevant parameters and the condition formulas are listed in Table 4:

TABLE 4

| F1(mm) | f4(mm) | f5(mm) | Fw(mm) | Lw(mm) | Φw(1/mm) |
|---|---|---|---|---|---|
| −44.543 | −14.446 | 25.801 | 21.968 | 83.363 | 0.045 |

In FIGS. 3-10, the curves a1, b1, and c1 show the longitudinal aberration characteristics of light of the wavelengths 450 nm, 550 nm, and 630 nm in the projection lens system 10. The curves at, as, bt, bs, ct, and cs show the meridional and sagittal field curvatures of light of the wavelengths 450 nm, 550 nm, and 630 nm in the projection lens system 10. The curve abc shows distortion characteristics of light of the wavelengths 450 nm, 550 nm, and 630 nm in the projection lens system 10. The curves a2, b2, and c2 depict the lateral color aberration characteristics of light of the wavelengths 450 nm, 550 nm, and 630 nm in the projection lens system 10. As shown in FIGS. 3-10, various aberrations occurring in the projection lens system 10 are controlled, increasing the resolution of the projection lens system 10.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A projection lens system, in this order from a screen-side to an SLM-side thereof, comprising:
   a first lens group of negative refractive power, the first lens group comprising a first lens; and
   a second lens group of positive refractive power, the second lens group, in this order from the screen-side to the SLM-side of the projection lens system, comprising:
   a second lens of positive refractive power;
   a third lens of positive refractive power;
   a fourth lens of negative refractive power; and
   a fifth lens of positive refractive power;
   the projection lens system satisfying the following condition formulas: 1.95<|F1/Fw|<2.15, 0.5<|f4/Fw|<0.7, and 1.05<|f5/Fw|<1.25, where F1 is the effective focal length of the first lens group, f4 is the focal length of the fourth lens, and f5 is the focal length of the fifth lens, Fw is the effective focal length of the projection lens system which is in a wide-angle state;
   wherein the projection lens system satisfies the following condition formula: 0.45<|Vd4/Vd5|<0.55, where Vd4 and Vd5 are the Abbe numbers of light at the wavelength of 587.6 nm in the fourth lens and the fifth lens fifth, respectively.

2. The projection lens system of claim 1, wherein the first lens is a plastic aspheric lens, and the second lens, the third lens, the fourth lens, and the fifth lens are glass spherical lenses.

3. The projection lens system of claim 2, wherein the glass lenses can be made of glass material of a refractive index less than 1.85.

4. The projection lens system of claim 1, wherein the projection lens system satisfies the following condition formula: Lw*Φw<3.8, wherein Lw is the total length of the projection lens system which is in the wide-angle state, Φw is the total refractive power of the projection lens system which is in the wide-angle state.

5. The projection lens system of claim 1, further comprising an aperture stop positioned between the fourth lens and the fifth lens.

6. The projection lens system of claim 5, wherein the aperture stop is configured for moving along with the second lens group when zooming while remains an aperture thereof unchanged.

7. The projection lens system of claim 5, wherein the aperture stop is positioned on a surface of the fourth lens that faces the fifth lens.

* * * * *